No. 733,275. PATENTED JULY 7, 1903.
N. G. ROBINSON.
BAND CUTTER AND FEEDER FOR CORN SHREDDERS AND HUSKERS.
APPLICATION FILED JAN. 23, 1903.
NO MODEL.
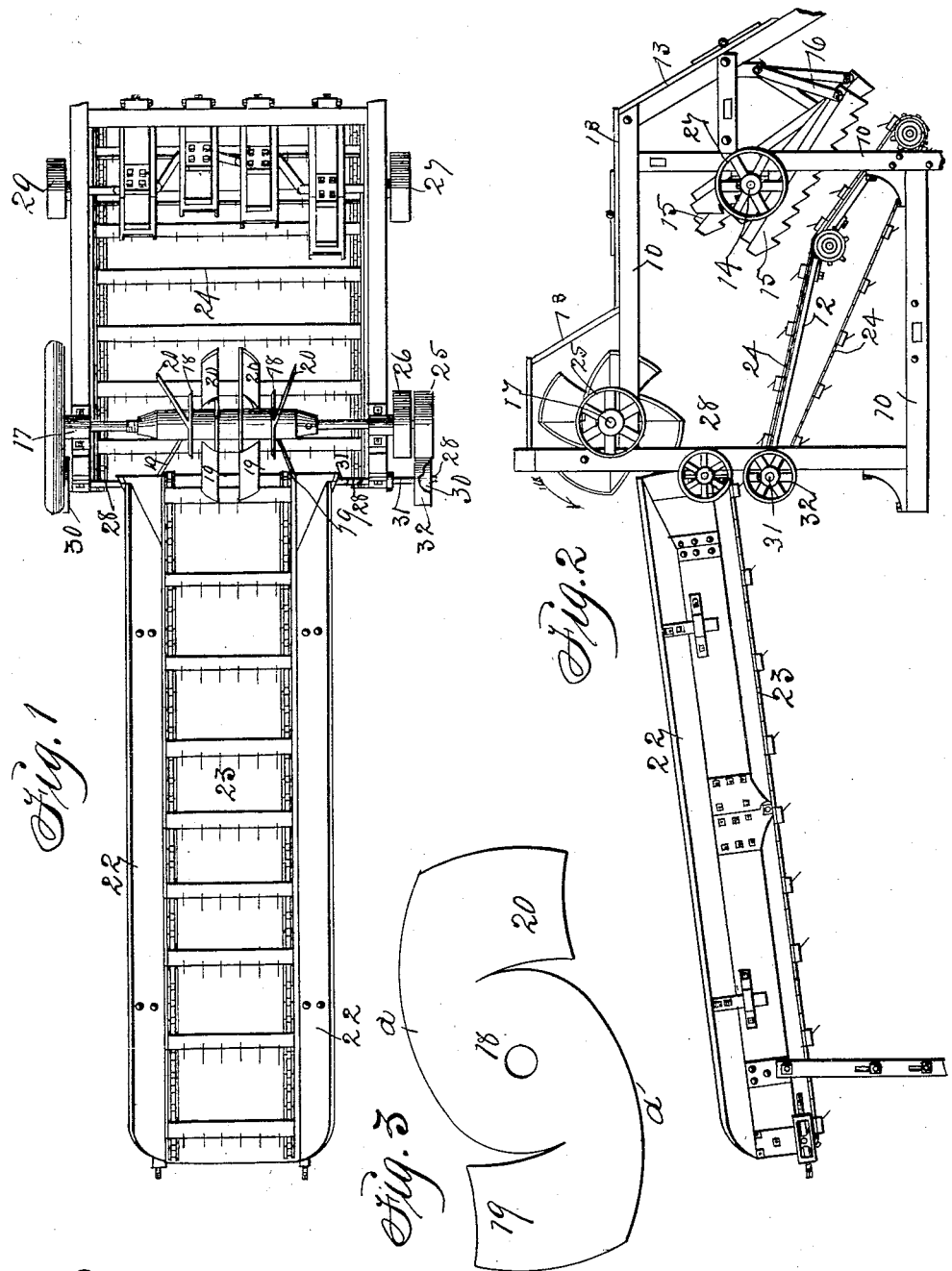

No. 733,275.

Patented July 7, 1903.

UNITED STATES PATENT OFFICE.

NATHANIEL G. ROBINSON, OF WOOLSTOCK, IOWA.

BAND-CUTTER AND FEEDER FOR CORN SHREDDERS AND HUSKERS.

SPECIFICATION forming part of Letters Patent No. 733,275, dated July 7, 1903.

Application filed January 23, 1903. Serial No. 140,317. (No model.)

*To all whom it may concern:*

Be it known that I, NATHANIEL G. ROBINSON, a citizen of the United States, residing at Woolstock, in the county of Wright and State of Iowa, have invented a new and useful Improved Band-Cutter and Feeder for Corn Shredders and Huskers, of which the following is a specification.

My object is to provide a simple, strong, durable, and efficient band-cutter and feeder specially adapted for feeding bundles of corn to brushing-rollers and a shredder-cylinder.

My invention consists in the construction, arrangement, and combination of parts as hereinafter set forth, pointed out in my claims, and illustrated in the accompanying drawings, in which—

Figure 1 is a top view, from which the roof of the frame and case is omitted. Fig. 2 is a side elevation of my machine, that shows the positions of the different operative elements relative to each other and the frame and case with which they are connected. Fig. 3 is a diagrammatical view of a blank adapted for making a band-cutter complete from one piece to be fixed to the cutter-shaft to coöperate with an endless carrier to advance bundles to the cylinder of a threshing-machine or cornstalk-shredder.

The numeral 10 designates the frame, 12 a fixed double inclined bottom, and 13 a fixed roof on the frame. A crank-shaft 14 is mounted in bearings fixed to the rear corner-uprights of the frame, and a plurality of rake-bars 15 are pivotally connected with the cranks of the shaft at their central portions and with the frame at their rear ends by means of links 16. A cutter-shaft 17 is mounted in bearings fixed to the top and rear portion of the frame 13. A plurality of cutters of peculiar shape, each made from a single piece of sheet steel or blank, (shown in Fig. 3,) are fixed to the cutter-shaft 17. Each cutter has a circular central portion 18 and wings 19 and 20, that project in reverse ways relative to the axis of the shaft 17 and incline laterally relative to their central portions and are arranged relative to each other, as shown in Fig. 1, so that the two central ones will extend longitudinally at right angles to those fixed to the end portions of the shaft. The peculiar shape of the blank produces a curved cutting edge a, that extends from the outer end of one of the end portions of the complete cutter into the central part of the other end portion of the complete cutter and is inclined laterally to the center of the complete cutter.

By the peculiar form of the cutters having wings inclined laterally to their center portions they are specially adapted to serve as band-cutters and feeders and spreaders of bundles and to coöperate with the rake-bars 15 in separating and advancing advantageously the stalks to the cylinder of a thresher or shredder-machine. The curved eccentric cutting edges are thus very materially lengthened without extending their outer ends relative to the shaft to which they are fixed.

A jointed and foldable conveyer-frame 22 is connected with the rear uprights of the frame 13, and 23 is an endless carrier mounted in the frame and adapted to be connected with the cutter-shaft 17 by means of wheels and belts, as hereinafter set forth.

An endless carrier 24 is mounted on the double inclined bottom 12 and connected with the cutter-shaft by means of fixed pulleys and a belt.

To transmit power from the cylinder-shaft of a thresher or shredder-machine, a band-wheel 25 is fixed on one end of the cutter-shaft 17 for connecting the cutter-shaft with the cylinder-shaft in a common way by means of an endless belt.

To transmit power from the cutter-shaft 17 to the crank-shaft 14, a band-wheel 26 is fixed to the cutter-shaft and a corresponding wheel 27 to the crank-shaft and applying a belt on said wheels.

To transmit power from the crank-shaft 14 to the shaft 28 of the endless carriage 23, a belt-wheel 29 is fixed to said crank-shaft and a corresponding wheel 30 to the carrier-shaft 28 for a belt adapted to be placed on said wheels.

To transmit power from the shaft 31 to the endless carrier 24, a shaft 31 is mounted at the upper end of the double inclined bottom 12 in a plane below the shaft 28, as shown in Fig. 2, and provided with a belt-wheel 32 and the corresponding wheel fixed on the end of the shaft 28 to be connected by means of a belt. (Not shown.)

Having thus described the purpose of my invention and the construction, arrangement, and combination of all the elements and subcombinations, its practical operation and utility will be understood by persons familiar with the art to which it pertains, and

What I claim as new, and desire to secure by Letters Patent, is—

1. In a band-cutter and feeder, a cutter formed from a single piece of sheet-steel consisting of a circular central portion adapted to be fixed to a shaft, wings projecting outward and laterally from the circumference of said central portion in opposite directions and curved cutting edges extending from the outer end of one end portion of the complete cutter into the central portion of the other end portion, as shown and described for the purposes stated.

2. In a band-cutter and feeder, a rotatable shaft, a plurality of cutters, each consisting of a circular central portion having wings projecting laterally in opposite directions from its circular center and a curved cutting edge extending from the outer end of each end portion of the complete cutter into the central portion of the other end portion of the complete cutter, fixed to the shaft in right-angled positions relative to each other, as shown and described for the purposes stated.

3. An improved band-cutter and feeder comprising a rotatable shaft mounted on the top and front end of a suitable frame, a plurality of cutters, consisting of circular central portions and wings projecting laterally from the circumference of the central portion, fixed to the shaft in right-angled positions relative to each other, a crank-shaft in a plane below the said cutters, rakes pivotally connected with the cranks of said shaft at their central portions and pivotally connected at their lower ends with the frame of the machine by means of links, a double inclined bottom fixed to the frame in a plane below the said rakes and an endless carrier mounted on said bottom, a jointed conveyer-frame hinged to the machine-frame and an endless carrier mounted on the conveyer-frame, arranged and combined to operate in the manner set forth for the purposes stated.

NATHANIEL G. ROBINSON.

Witnesses:
J. M. OMSTEAD,
M. H. HIRT.